Figure 1:
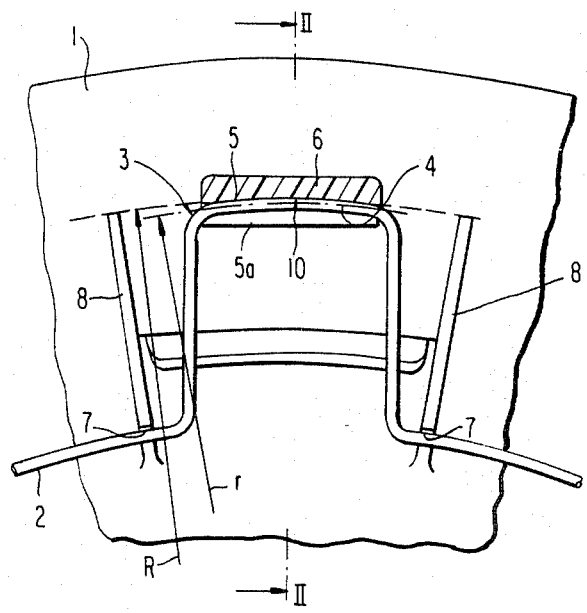

United States Patent [19]

Schobbe

[11] Patent Number: 4,529,251
[45] Date of Patent: Jul. 16, 1985

[54] WHEEL COVER FOR PASSENGER MOTOR VEHICLES

[75] Inventor: Hermann Schobbe, Fellbach, Fed. Rep. of Germany

[73] Assignee: Daimler-Benz Aktiengesellschaft, Stuttgart, Fed. Rep. of Germany

[21] Appl. No.: 463,318

[22] Filed: Feb. 2, 1983

Related U.S. Application Data

[63] Continuation of Ser. No. 200,467, Oct. 24, 1980, abandoned.

[30] Foreign Application Priority Data

Oct. 25, 1979 [DE] Fed. Rep. of Germany ....... 2943138

[51] Int. Cl.³ ............................................. B60B 7/06
[52] U.S. Cl. ............................... 301/37 P; 301/37 R; 301/37 PB
[58] Field of Search .............. 301/37 R, 37 P, 37 B, 301/37 AT, 37 T, 37 TP, 37 PB, 108 R, 108 A, 108 S, 108 SC, 37 S, 37 SC, 37 C, 37 CD; 220/320; 292/256.6, 256.61, 256.65

[56] References Cited

U.S. PATENT DOCUMENTS

| 1,817,194 | 8/1931 | Hunt | 301/108 R |
| 2,497,897 | 2/1950 | Lyon | 301/37 C |
| 3,747,984 | 7/1973 | Andrews et al. | 301/37 P |
| 3,794,385 | 2/1974 | Kretschmer | 301/37 P |
| 4,027,919 | 6/1977 | Foster et al. | 301/37 P X |

Primary Examiner—Charles A. Marmor
Attorney, Agent, or Firm—Craig & Burns

[57] ABSTRACT

A wheel cover, especially for passenger motor vehicles, which includes a wire ring serving as a mounting element. The wire ring is provided with outwardly projecting lug-shaped members which are adapted to engage into a recess of a rim of the wheel and held in an axial and peripheral direction at the wheel cover within guides. The guides are constructed as tongue-like covers extending from the outside over the lug-shaped members and are resilient in the radial direction.

22 Claims, 2 Drawing Figures

WHEEL COVER FOR PASSENGER MOTOR VEHICLES

This application is a continuation application of the parent application Ser. No. 200,467, filed Oct. 24, 1980, now abandoned.

The present invention relates to a wheel cover and, more particularly, to a wheel cover for passenger motor vehicles which includes a wire ring serving as a mounting element and which is provided with outwardly projecting lug-shaped members, which lug-shaped members may be locked into a recess on a rim of the wheel and are held at the wheel cover in axial guides and in a peripheral direction.

A hubcap or wheel cover of the aforementioned type is proposed in U.S. Pat. No. 2,746,805 wherein the wheel cover provides tubular guides, fixedly joined to the wheel cover, for the wire ring or parts of the wire ring, wherein the wire ring is axially held and is fixedly disposed in the peripheral direction by bent lug-shaped members forming abutments for end faces of the tubular guides.

A disadvantage of the aforementioned proposed construction resides in the fact that the manufacturing expenses for such wheel covers are relatively high. A further disadvantage resides in the fact that the wire lug-shaped parts, which consist of a metal, are in direct contact with the metallic surfaces of the wheel rim and, consequently, can lead to a marring of the rim of the wheel by scraping.

This is true, in principle, for other types of construction (German Auslegeschrift No. 26 22 908), in which the axial guidance and the guidance in the peripheral direction are attained by slotted guide means fixedly arranged at the wheel cover, whereby lug-shaped members of a wire ring extend through the slotted guide means from the inside toward the outside. A disadvantage of this proposed construction resides in the fact that forces in a peripheral direction which may occur, for example, by vibrations or the like may lead to damaging of the guide means at the wheel cover.

In German Patent Application No. P 29 39 063.4, a wheel cover of the aforementioned type is proposed which provides tongue-like covers for extending over the lug-shaped members. However, in this last proposed arrangement, it is only intended to avoid a metallic contact of the lug-shaped members against a rim of the wheel while the axial guiding action as well as the peripheral guidance is effected by separate guide slots at the wheel cover proper. Consequently, even with this proposed arrangement, the lug-shaped member may strike against the associated guide means in case of vibrations thereby leading to a rattling noise.

The aim underlying the present invention essentially resides in providing a wheel cover of the aforementioned type in which the axial guide means and the guide means in the circumferential direction are constructed in such a manner that a damaging of the guide means themselves is impossible, that annoying rattling noises are safely avoided, and that also a scraping of the wheel rim is eliminated.

In accordance with the present invention, a wheel cover of the aforementioned type is proposed wherein the guide means are constructed as tongue-like or flap-like covers which extend on the outside over a lug-shaped member and are radially resilient. By virtue of the features of the present invention, all vibrations in an axial as well as peripheral directions are absorbed by the tongue-like or flap-like covers which may be constructed so that even though they are still radially resilient, they leave only a very small possibility of movement for the associated wire ring in the peripheral direction and in the axial direction which advantageously enables the utilization of a very simple tool for its manufacture.

Advantageously, in accordance with further features of the present invention, the tongue-like or flap-like covers may be provided with an inner groove for receiving cross webs delimiting the lug-shaped members along the outer side thereof and, additionally, the cross webs and the inner grooves, for the purposes of positional securing in the circumferential direction, may be provided with contact or abutment surfaces of a smaller diameter, arranged offset in the circumferential direction with respect to the largest radial diameter of the inner groove. For this purpose, cam-like projections may be coordinated to the cross webs, whereby the projections are adapted to engage into corresponding recesses provided in the tongue-like covers.

In accordance with further especially advantageous features of the present invention, the contact or abutment surfaces may be constructed as wall portions of a circular-arcuate shape, the center of which is eccentric with respect to the center of the wheel cover. In this manner, the contact or abutment surfaces may be parts of an inner groove in the tongue-like covers, whereby the groove has the shape of a circular arc and is adapted, in its cross section and radius, to the diameter and radius of the cross web of the lug-shaped member associated with the wire ring. By virtue of this construction, advantageously, a very large contact or abutment surface is formed so as to permit an improved force transmission without high stresses or pressures per unit area. This improved force transmission is especially significant when, for example, the tongue-like covers and the wheel cover are manufactured from a synthetic resinous material.

Advantageously, the inner groove in the flap-like or tongue-like covers of the present invention may pass over toward the side facing away from the wheel cover into a bevelled surface widening beak-like on the radially inwardly disposed side of the flap-like or tongue-like covers.

To provide a simple construction of the tongue-like covers to be radially resilient but relatively rigid in the axial and circumferential directions, in accordance with further features of the present invention, the tongue-like covers are connected, by way of web portions with the wheel cover with the web portions being relatively thin in the radial direction but constructed to be relatively wide in a direction tangential to the circumferential direction.

In spite of the fact that the wire ring is guided exclusively in the tongue-like covers, it is also possible in accordance with the present invention to pretension the wire ring by providing axial projections at the wheel cover, which form radial abutments for the wire ring.

For the purpose of rigidifying and/or connecting two parts of the wheel cover arranged concentrically to each other, the abutments are arranged at radially directed webs of the wheel cover.

Accordingly, it is an object of the present invention to provide a wheel cover for a motor vehicle which avoids, by simple means, the aforementioned shortcomings and disadvantages encountered in the prior art.

Another object of the present invention resides in providing a wheel cover for a motor vehicle which safely prevents rattling noises when the wheel cover is mounted at the rim of a wheel.

A further object of the present invention resides in providing a wheel cover which ensures a positive and accurate axial and circumferential guidance of lug-shaped members in the wire ring of the wheel cover.

A still further object of the present invention resides in providing a wheel cover for a motor vehicle which minimizes if not avoids a marring of the rim of the wheel.

A still further object of the present invention resides in providing a wheel cover for a motor vehicle which exhibits an improved force transmission without the existence of high stresses.

Yet another object of the present invention resides in providing a wheel cover for a motor vehicle which is simple in construction and therefore relatively inexpensive to manufacture.

Figure 2:
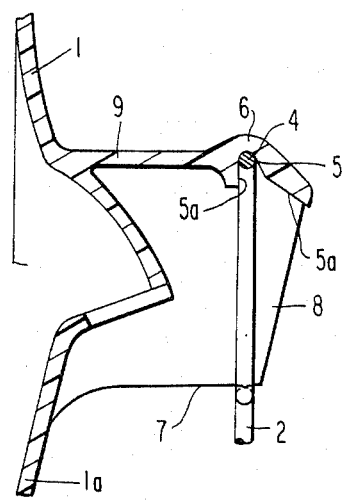

These and other objects, features, and advantages of the present invention will become more apparent from the following description when taken in connection with the accompanying drawings which show, for the purposes of illustration only, one embodiment in accordance with the present invention, and wherein:

FIG. 1 is a schematic partial view on the inside of a wheel cover in accordance with the present invention in which a lug-shaped member of a wire ring, held under a prestress, is guided in tongue-like covers; and FIG. 2 is a partial cross sectional view taken along the line II—II in FIG. 1.

Referring now to the drawings wherein like reference numerals are used in both views to designate like parts and, more particularly, to FIG. 1, a wheel cover 1, preferably formed of a synthetic resinous material, is provided with a wire ring 2. The wire ring 2 is attached as a mounting element on the rear side of the wheel cover 1, which faces the rim of the wheel (not shown). The wire ring 2 is provided with outwardly projecting lug-shaped members generally designated by reference numeral 3, each of which includes a cross web 4 held in an inner groove shaped recess or aperture 5 provided in tongue-like covers 6 which are integrally manufactured with the wheel cover 1. In the illustrated embodiment, the wire ring is attached to the wheel cover 1 under prestress and, for this purpose, abuts under prestress against radial abutments 7 on both sides of the lug-shaped members 3, the abutments 7 being provided on radially extending webs 8. The radially extending webs 8 of the wheel cover 1 also reinforce the wheel cover 1 and/or if the wheel cover 1 is constructed of two parts 1, 1a (FIG. 2) disposed concentrically to each other, serve to connect the two parts 1, 1a with each other.

As shown in FIG. 2, the inner groove shaped recess or aperture 5 is delimited toward the rear thereof by a wall portion 5a and passes over in the forward direction into a beak-like beveled surface 5b which facilitates the insertion of the cross web 4 into the groove 5. The tongue-like covers 6 are connected in one piece with the wheel cover 1 by way of the webs 9 which are constructed relatively thin in the radial direction but relatively wide in a direction tangential to the circumferential direction as can be seen, for example, from the length of the cover 6 shown in FIG. 1.

As clearly shown in FIG. 1, the inner groove-shaped recess or aperture 5 has the configuration of a circular arc corresponding approximately to the circular arc-shaped construction of the cross web 4. The cross web 4 is curved with a radius of curvature r. This radius of curvature r has a center point which is arranged eccentrically with respect to the center point of radius. R corresponding to a circle which extends through the radially outermost point 10 of the lug-shaped member 3 and is circumscribed around the center of the wheel cover 1.

By virtue of this eccentric arrangement, contact or abutment surfaces are formed inside the inner groove shaped recess or aperture 5 which are displaced radially inwardly with respect to the largest radial diameter, namely, point 10, and have respectively smaller diameters. As a result thereof, abutment surfaces are formed in the circumferential direction which ensure a perfect guidance of the wire lug-shaped member 3 in the circumferential direction without having to provide the lug-shaped member 3 with cam-like projections or the like at its cross web 4 which actually would also be possible as such, so that forces can be introduced into the synthetic resinous material in the circumferential direction with a very low pressure per unit area.

The tongue-like covers 6 take over the fuction of securing the wire ring 2 in the circumferential direction and in the axial direction. In the radial direction, the cover 6 is resilient so that the wire ring 2 which contacts the abutments 7 under prestress, is able to yield resiliently toward the inside when the wheel cover is inserted into the rim of the wheel and under the force exerted thereby on the cover 6 from the outside and is able to press the wire lug-shaped part 3 firmly into the recess (not shown) of the wheel rim. The cross web 4 then does not directly abut at the metal of the wheel rim but exclusively by way of the cover 6. Consequently, the rim of the wheel cannot be marred by scraping. Moreover, since in this position the wire ring 2 no longer rests against the abutments 7, vibrations occurring in the wire ring 2 and in the wheel cover 1 cannot lead to a contact between the wire ring 2 and the synthetic resinous parts of the wheel cover 1 at any place of the assembly. The wire ring 2 is retained exclusively by means of the cover 6 by way of the webs 9.

While I have shown and described only one embodiment in accordance with the present invention, it is understood that the same is not limited thereto but is susceptible of numerous changes and modifications as known to one having ordinary skill in the art, and I therefore do not wish to be limited to the details shown and described herein, but intend to cover all such modifications as are encompassed by the scope of the appended claims.

I claim:

1. A wheel cover for a passenger motor vehicle, the wheel cover comprising means for enabling mounting of the wheel cover on a rim of a wheel, the mounting means including a wire ring having outwardly projecting lug-shaped members, and means provided on the wheel cover for axially and circumferentially guiding the lug-shaped members, characterized in that the guide means include radially resilient tongue-like covers adapted to extend over the lug-shaped members from the outside thereof, each lug-shaped member including a cross web, an inner groove is provided in the covers for accommodating a respective cross web of the lug-shaped members, the cross webs and inner grooves are each provided with abutment surface means for securing the cross webs in the circumferential direction, and in that the abutment surface means of the inner grooves are of a smaller diameter than the radial diameter passing through the radially outermost point of the cross web and are disposed radially inwardly with respect to the largest radial diameter.

2. A wheel cover according to claim 1, characterized in that the respective abutment surface means include wall portions having a circular arcuate shape with a center of the circular arcuate shape being disposed eccentrically to a center of the wheel cover.

3. A wheel cover according to claim 2, characterized in that the wall portions are formed by portions of the inner groove, and in that the inner groove has a cross section and radius adapted to a diameter and radius of the cross webs.

4. A wheel cover according to claim 2, characterized in that the groove passes over on the side thereof facing away from the wheel into a widening beveled surface on a radially inwardly disposed side of the tongue-like cover.

5. A wheel cover according to claim 4, characterized in that web means are provided for connecting the respective covers to the wheel cover, said web means are relatively thin in the radial direction and are relatively wide in a direction tangential to the circumferential direction.

6. A wheel cover according to claim 5, characterized in that means are provided for enabling the mounting means to be attached to the wheel cover under prestress.

7. A wheel cover according to claim 6, characterized in that said last-mentioned means includes a plurality of radial abutments.

8. A wheel cover according to claim 7, characterized in that means are provided for rigidifying the wheel cover including a plurality of radially extending webs, and in that said abutments are located at respective webs.

9. A wheel cover according to claim 7, characterized in that the wheel cover includes at least a pair of concentrically disposed wheel cover parts, and in that a plurality of radially extending web means are provided for connecting the wheel cover parts to each other.

10. A wheel cover according to claim 9, characterized in that the radial abutments are disposed at the respective web means.

11. A wheel cover according to claim 1, characterized in that web means are provided for connecting the respective covers to the wheel cover, said web means are relatively thin the a radial direction and are relatively wide in a direction tangential to the circumferential direction.

12. A wheel cover according to claim 1, characterized in that means are provided for enabling the mounting means to be attached to the wheel cover under prestress.

13. A wheel cover according to claim 12, characterized in that said last-mentioned means includes a plurality of radial abutments.

14. A wheel cover according to claim 12, characterized in that means are provided for rigidifying the wheel cover including a plurality of radially extending webs, and in that said abutments are located at respective webs.

15. A wheel cover according to claim 1, characterized in that the wheel cover includes at least a pair of concentrically disposed wheel cover parts, and in that a plurality of radially extending web means are provided for connecting the wheel cover parts to each other.

16. A wheel cover arrangement for a motor vehicle including a wheel cover and means for mounting the wheel cover on a rim of a wheel, said mounting means including:
- a wire ring having a plurality of radially outwardly projecting lug-shaped portions disposed around the circumference of the ring, and
- guide means on the wheel cover for guidingly holding the wire ring in position at said wheel cover,
- the guide means including radially resilient tongue-like members extending from the wheel cover and operable to engage over respective ones of said lug-shaped portions, radially outwardly facing surfaces of the tongue-like members being engageable with radially inwardly facing surfaces of a wheel rim when the wheel cover is in an "installed" position on a wheel, and
- the tongue-like members being provided with abutment surface means engageable with said lug-shaped portions to guide and position the lug-shaped portions and the wire ring at the wheel cover in the radial direction as also in the circumferential direction.

17. An arrangement according to claim 16, wherein the abutment surface means are formed at least in part by aperture means in said tongue-like members.

18. An arrangement according to claim 17, wherein at least some of abutment surface means are located adjacent to each lug-shaped portion on both sides thereof, as seen in the circumferential direction.

19. A wheel cover for a passenger car having a wire ring on the backside of said wheel cover, said wire ring being supported against radially yielding cover members, projecting from said wheel cover which serve as abutment means for the wire ring and guide said wire ring axially and in the circumferential direction, said cover members being provided with further means for receiving said wire ring, and the outer surfaces of the cover members being operable to engage in a recess of the wheel rim for fixing the wheel cover with respect to the wheel rim, the wire ring engaging in the further means by way of outwardly projecting lug-shaped parts of the wire ring, and the cover members being provided with radial and circumferentially mutually displaced guide and abutment surface means for guiding and positioning the lug-shaped parts and the wire ring in the circumferential direction.

20. A wheel cover according to claim 19, wherein said further means are circumferentially extending wire-receiving means for the wire of the wire ring.

21. A wheel cover for a passenger car having a wire ring on the backside of said wheel cover, said wire ring being supported against radially yielding cover members projecting from said wheel cover section-wise over its circumference and serving as supporting abutment for said wire ring, said cover members being provided with further means which serve as means for receiving and axially and radially guiding said wire ring, and said cover members being able to engage in a recess of the wheel rim for fixing the wheel cover with respect to the wheel rim, the wire ring, within the area of its support with respect to the cover members, being provided with radial projections serving to guide and position the wire ring in the circumferential directions by way of the further means, and the cover members having radial and circumferentially mutually displaced abutment surfaces means forming a part of said further means.

22. A wheel cover according to claim 21, wherein said further means serving as means for receiving and axially and radially guiding said ring extend substantially in the circumferential direction of the wheel cover and are so constructed as to receive the wire of the wire ring.

* * * * *